(12) United States Patent
Rimassa et al.

(10) Patent No.: US 7,998,908 B2
(45) Date of Patent: *Aug. 16, 2011

(54) FLUID LOSS CONTROL AND WELL CLEANUP METHODS

(75) Inventors: Shawn McCleskey Rimassa, Houston, TX (US); Mehmet Parlar, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 439 days.

This patent is subject to a terminal disclaimer.

(21) Appl. No.: 11/609,367

(22) Filed: Dec. 12, 2006

(65) Prior Publication Data

US 2008/0139416 A1 Jun. 12, 2008

(51) Int. Cl.
*C09K 8/528* (2006.01)
*C09K 8/02* (2006.01)
*C09K 8/68* (2006.01)
*E21B 43/16* (2006.01)
*E21B 21/00* (2006.01)

(52) U.S. Cl. ..... 507/241; 507/103; 507/200; 166/305.1; 166/311

(58) Field of Classification Search .................. 507/103, 507/200, 241; 166/305.1, 311
See application file for complete search history.

(56) References Cited

U.S. PATENT DOCUMENTS

| | | |
|---|---|---|
| 4,848,467 A | 7/1989 | Cantu |
| 4,957,165 A | 9/1990 | Cantu |
| 4,986,355 A | 1/1991 | Casad |
| 5,165,477 A | 11/1992 | Shell |
| 5,247,995 A | 9/1993 | Tjon Joe Pin |
| 5,566,759 A | 10/1996 | Tjon Joe Pin |
| 5,678,632 A | 10/1997 | Moses |
| 5,881,813 A | 3/1999 | Brannon |
| 6,110,875 A | 8/2000 | Tjon Joe Pin |
| 6,140,277 A | 10/2000 | Tibbles |
| 6,263,967 B1 | 7/2001 | Morris |
| 6,534,449 B1 | 3/2003 | Gilmour |
| 6,569,814 B1 | 5/2003 | Brady |
| 6,631,764 B2 | 10/2003 | Parlar |
| 6,638,896 B1 | 10/2003 | Tibbles |
| 6,763,888 B1 | 7/2004 | Harris |
| 6,831,044 B2 | 12/2004 | Constien |
| 6,883,608 B2 | 4/2005 | Parlar |
| 6,978,838 B2 | 12/2005 | Parlar |
| 7,166,560 B2 | 1/2007 | Still |
| 7,216,705 B2 | 5/2007 | Saini et al. |
| 7,276,466 B2 | 10/2007 | Todd |
| 7,553,800 B2 | 6/2009 | Munoz, Jr. |
| 2004/0106525 A1* | 6/2004 | Willberg et al. .............. 507/200 |
| 2005/0034865 A1 | 2/2005 | Todd |
| 2005/0056423 A1 | 3/2005 | Todd |
| 2005/0139354 A1 | 6/2005 | Salamat |
| 2005/0252659 A1* | 11/2005 | Sullivan et al. ............ 166/280.1 |
| 2006/0157248 A1 | 7/2006 | Hoefer |

FOREIGN PATENT DOCUMENTS

| | | |
|---|---|---|
| WO | 2004007905 A1 | 1/2004 |
| WO | 2005095755 A1 | 10/2005 |

\* cited by examiner

*Primary Examiner* — Milton I Cano
*Assistant Examiner* — Aiqun Li
(74) *Attorney, Agent, or Firm* — Rachel Greene; David Cate; Jeff Griffin

(57) ABSTRACT

A method for removing preexisting filtercake from a portion of a subterranean formation penetrated by a wellbore is carried out by providing water-degradable particles formed from a solid polymeric acid precursor material that is capable of a degrading to acid for reacting with materials of the filtercake. A slurry is formed from the particles with a carrier fluid. The slurry of particles is introduced into the formation through the wellbore and allowed to degrade to form acid, whereby the formed acid facilitates decomposition of preexisting filtercake material. In certain applications, the water-degradable particles may also be used in combination with non-water-degradable particles, which may be used for forming a gravel pack. The water-degradable particles may also be used to reduce fluid loss temporarily to areas of the formation immediately surrounding the wellbore.

23 Claims, 2 Drawing Sheets ns and method for fluid loss control in a subterranean formation. More particularly it relates to the use of a fluid containing a delayed solid acid material that can either remove drilling mud filtercakes or create a self-destructing filtercake in subterranean formations that require fluid loss control.

FLUID LOSS CONTROL AND WELL CLEANUP METHODS

BACKGROUND

This invention relates to a composition and method for removing impermeable layers created for fluid loss control in a subterranean formation. More particularly it relates to the use of a fluid containing a delayed solid acid material that can either remove drilling mud filtercakes or create a self-destructing filtercake in subterranean formations that require fluid loss control.

During drilling of a well, a thin layer of impermeable material is deposited on the reservoir rock by the drilling fluid (or mud). This thin layer of material is called a filtercake and aids in controlling drilling fluid leak-off into the formation and restricts the inflow of reservoir fluids into the well during completion. If the filtercake that is created during the drilling process is not removed prior to or during completion of the well, problems may occur when the well is put on production. These may include completion equipment failures, such as erosion and plugging of the equipment, and impaired reservoir productivity, which may be in the form of early water production or water coning.

The major components typically found in conventional drilling mud filtercake include such materials as polymers, carbonates and other inorganic salts, and clays. Removal of the mud filtercake can be accomplished through mechanical means (scrapping, jetting, underreaming, etc). Conventional chemical treatments for removing filtercake include pumping aqueous solutions with an oxidizer (such as persulfate), inorganic acids (such as HCl), organic acids (such as acetic or formic acids), chelating agents (such as EDTA), enzymes or combinations of these. Generally, the oxidizer or enzyme digests the polymer layer in the filtercake and the acids dissolve the carbonate portion in the filtercake.

There are several problems that exist in conventional filtercake removal. The acids used tend to react very quickly with carbonate and "wormholes" are readily formed where most of the acid will funnel off through these small openings into the reservoir and leave most of the zone untreated. Oxidizers are very corrosive and reactive. They also must be pumped as a separate stage, which causes operational complexity and extra cost. Additionally, the lifetime of an oxidizer at higher temperatures may be only a few seconds. Enzyme breakers are extremely sensitive to pH, temperature, and ionic strength. They are not effective in breaking polymers in acidic solutions and will lose their activity at higher temperatures. Chelants are weak acids and poor dissolvers of carbonate compared to other organic acids, such as acetic and formic acid. Catalysts and activators require a second step in the completion process that causes additional operational costs.

Depending on the composition of the formation (such as quicksand or unconsolidated sands, partially consolidated sands, or friable sands), sand control operations such as gravel packing are commonly implemented in order to stabilize a wellbore after drilling. In a gravel packing operation, a screen is placed in the wellbore and then gravel of a specific size is placed in the annulus between the screen and the reservoir to stop sand movement and sand production from the reservoir. The installation of a gravel pack typically entails the use of a carrier fluid (such as brine).

There are many oilfield applications that require the use of fluid loss control agents in the near well-bore region, within the formation itself or against sand control screens and gravel packs. Some of these applications are in cased and perforated wellbores, while others are in open holes.

In cased hole applications, the need for fluid loss control may occur immediately after perforating. In such cases, the most common practice has been to perforate with clean fluids (such as completion brines) and spot a fluid loss control pill to control losses into the formation while the perforating string is pulled out of the hole and either the production string or the sand control screens are run into the wellbore. In the former case, once the tubing is installed, the well is put on production. Presence of a low permeability filtercake formed by the fluid loss control pill often causes reduction in well productivity, unless a filtercake removal treatment is performed. Such treatments typically involve pumping acids into the wellbore. In the latter case, once the sand control screens are run in hole, often gravel packing or frac-packing is performed. The presence of a low permeability filtercake formed by the fluid loss control pill spotted after perforating can cause either unpacked or incompletely packed perforations, both of which result in productivity impairment. In these cases, often an acid treatment is performed prior to pumping a gravel pack or frac-pack treatment to ensure a high permeability gravel/proppant pack is placed into the perforations. Fluid loss is often experienced after frac-packing as well. Although the common practice for fluid loss control after frac packing is typically to use mechanical valves that isolate the zone of interest from the hydrostatic column above it, sometimes these valves fail, necessitating a fluid loss control pill to be spotted inside the sand control screens in order to provide fluid loss control while the sand control service tool is pulled out of the wellbore and the production tubing is run in hole. Thus, it would be desirable to have a fluid loss control pill that can form a filtercake, which will control losses for the desired time period (e.g., the time it takes to pull the perforating string out and run either the production tubing or the sand control string in to the wellbore, or pull the sand control service tool out and run the production tubing in) and self destruct when needed (e.g., when ready to produce or when the sand control screens are installed).

In open hole applications, fluid loss control pills may be needed immediately after sand control in cases where a mechanical valve has not been installed or the valve failed to operate. In such cases, the fluid loss control must be achieved against the screens and gravel.

In open hole completions, the low permeability filtercake is necessary during drilling, but can cause productivity impairment during production. In fact, in sand control completions, for example during gravel packing, particularly with low viscosity fluids such as brines (i.e., water packing), filtercake is required in order to gravel pack a well successfully, and thus it must be removed after gravel packing in order to maximize production rates as well as to provide uniform influx of hydrocarbons into the wellbore. Similarly, in stand alone screen or expandable screen applications (which do not involve gravel packing), filtercake is necessary for wellbore stability until the screens are installed, but needs to be removed prior to production. Filtercake removal in open hole completions has traditionally been done through spotting and/or circulation of acids. Although acids are effective in filtercake removal, assuring their contact with the filtercake across a long open hole section is not easily accomplished. This is because the reaction between the acid and the filtercake is very rapid, resulting in increased permeability in the sections where the acid contacts the filtercake first, and thus loss of all the acid into that section of the wellbore. The net result in this case is clean and unclean sections along the wellbore. This is undesirable since it results in reduced production rates and/or non-uniform influx, the latter causing premature water or gas breakthrough. Alternatively, enzyme or oxidizer soaks (to hydrolyze polymeric components of the filtercake) are performed, followed by an acid treatment. This process is also ineffective, since the reaction of the acid with carbonate bridging agents in the absence of coating with polymeric components (as it would be after the enzyme or oxidizer soak) is much faster than the reaction of acid with all components of the filtercake intact, causing the same problems. In addition, acids are corrosive to sand control screens.

Other alternatives include combining chelating agent solutions, which provide much slower reaction rates with much lower corrosion rates. Although enzyme and chelating agent solutions, or chelating agent solutions alone, have been effectively used in open hole completions, in longer wells, and particularly at higher temperatures, even they may react relatively quickly in long open hole completions, particularly in sand control applications. In such cases, after sand control treatment is performed, the wash pipe must be pulled out of the screens, activating a fluid loss control valve to isolate the formation from the hydrostatic column above.

Thus, it is desirable not to remove the filtercake until after the wash pipe is pulled out of the screen and the fluid loss valve is closed. In such cases, it is desirable to have a filtercake cleanup solution which is not reactive until after some time (e.g., until after the wash-pipe is pulled and the formation is isolated).

There is therefore a need to provide improvements in compositions and methods for filtercake removal and for providing effective and readily reversible fluid loss pills or treatments.

BRIEF DESCRIPTION OF THE DRAWINGS

For a more complete understanding of the present invention, and the advantages thereof, reference is now made to the following descriptions taken in conjunction with the accompanying figures, in which.

SUMMARY

Figure 1:
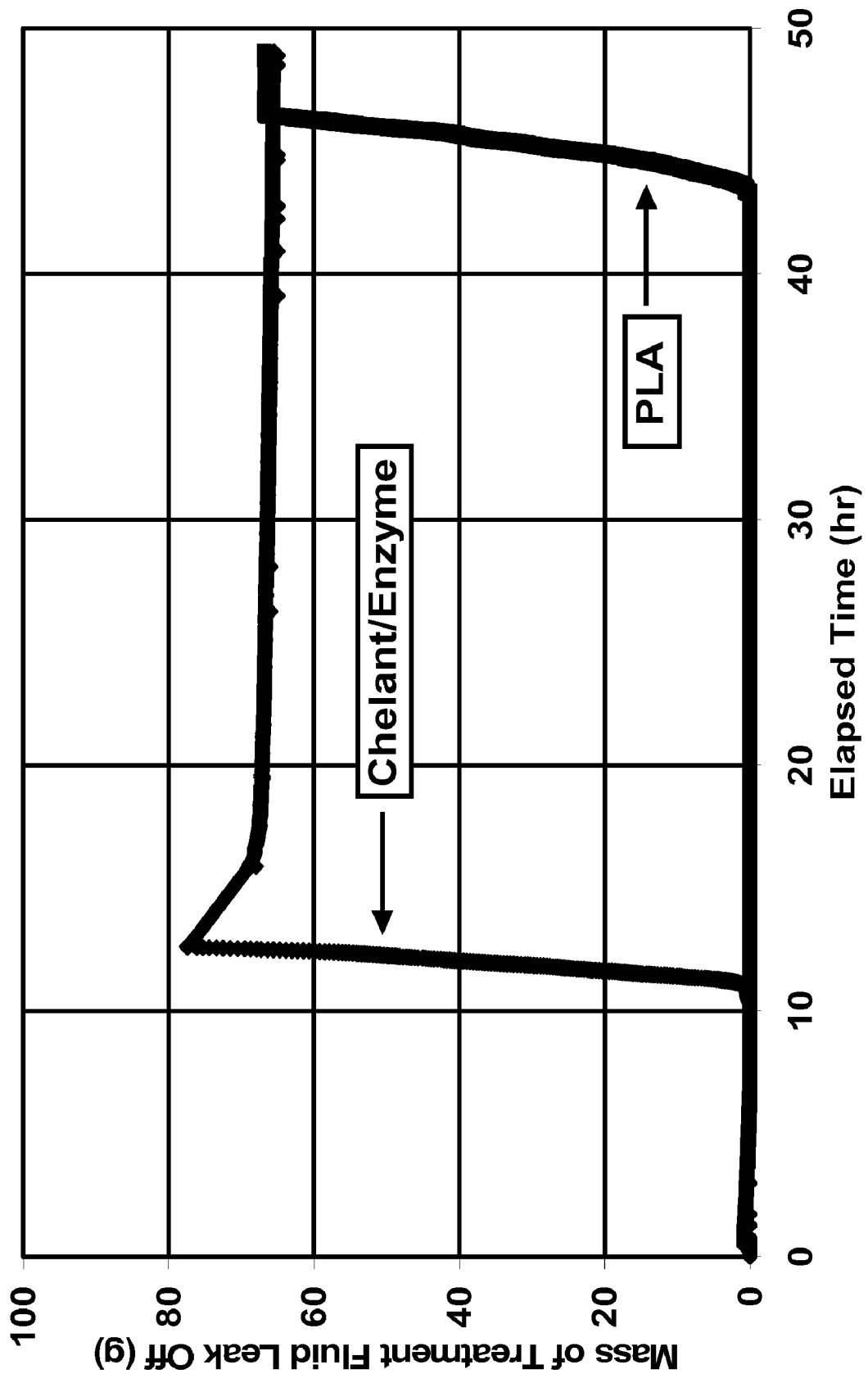
FIG. 1 is a plot of fluid leak off over time for a drilling mud filtercake treated with both a polylactic acid particle slurry and a chelant/enzyme solution.

One embodiment of the Invention is a method for removing preexisting filtercake from a portion of subterranean formation penetrated by a wellbore. The method includes the steps of: providing water-degradable particles formed from a solid polymeric acid precursor material that is capable of degrading to acid for reacting with materials of the filtercake; forming a slurry of the particles with a carrier fluid; introducing the slurry of particles into the wellbore; and allowing the water-degradable particles to degrade to form acid, whereby the formed acid facilitates decomposition of preexisting filtercake materials. In various aspects of this embodiment, the slurry further contains non-water-degradable particles formed from materials that are generally non-degradable by the formed acid; the slurry contains from about 0.05 kg/L to about 1.2 kg/L of non-water-degradable particles; the non-water degradable particles have an average particle size of from about 0.2 mm to about 2.5 mm; the slurry contains from about 0.05 kg/L to about 0.6 kg/L of the water degradable particles; the water-degradable particles are the sole particles within the carrier fluid; and the water-degradable particles have an average particle size of from about 2.5 mm or less. The solid polymeric acid precursor may be made from at least one of homopolymers of lactic acid, glycolic acid, hydroxybutyrate, hydroxyvalerate and epsilon caprolactone; random copolymers of at least two of lactic acid, glycolic acid, hydroxybutyrate, hydroxyvalerate, epsilon caprolactone, L-serine, L-threonine, and L-tyrosine; block copolymers of at least two of polyglycolic acid, polylactic acid, hydroxybutyrate, hydroxyvalerate, epsilon caprolactone, L-serine, L-threonine, and L-tyrosine; homopolymers of ethylenetherephthalate (PET), butylenetherephthalate (PBT) and ethylenenaphthalate (PEN); random copolymers of at least two of ethylenetherephthalate, butylenetherephthalate and ethylenenaphthalate; block copolymers of at least two of ethylenetherephthalate, butylenetherephthalate and ethylenenaphthalate; and combinations of these. In other aspects of the embodiment, the slurry further contains at least one of a corrosion inhibitor, an enzyme and a hydrofluoric acid source; the carrier fluid is brine containing a monovalent salt; the water-degradable particles are from about 0.1% to about 15% by total weight of the water-degradable and the non-water-degradable particles; the filtercake is an oil-based mud filtercake; and the filtercake is a reversible oil-based mud filtercake.

Another embodiment of the Invention is a method for removing preexisting filtercake from an area surrounding a wellbore penetrating a subterranean formation. The method involves: positioning a sand control screen within the wellbore; providing water-degradable particles formed from a solid polymeric acid precursor material that is capable of degrading to acid for reacting with materials of the filtercake; providing non-water degradable particles that are generally non-degradable by the formed acid, the non-water-degradable particles having an average particle size that is at least six times greater than the average particle size of the water degradable particles; forming a slurry of the particles with a carrier fluid; introducing the slurry of particles into the wellbore containing the sand control screen; and allowing the water-degradable particles to degrade to form acid, whereby the formed acid contacts and facilitates decomposition of preexisting filtercake materials. In various aspects, the slurry contains from about 0.05 kg/L to about 0.6 kg/L of the water degradable particles; the water-degradable particles are the sole particles within the carrier fluid; the water-degradable particles have an average particle size of from about 2.5 mm or less. The solid polymeric acid precursor may be made from at least one of homopolymers of lactic acid, glycolic acid, hydroxybutyrate, hydroxyvalerate and epsilon caprolactone; random copolymers of at least two of lactic acid, glycolic acid, hydroxybutyrate, hydroxyvalerate, epsilon caprolactone, L-serine, L-threonine, and L-tyrosine; block copolymers of at least two of polyglycolic acid, polylactic acid, hydroxybutyrate, hydroxyvalerate, epsilon caprolactone, L-serine, L- threonine, and L-tyrosine; homopolymers of ethylenetherephthalate (PET), butylenetherephthalate (PBT) and ethylenenaphthalate (PEN); random copolymers of at least two of ethylenetherephthalate, butylenetherephthalate and ethylenenaphthalate; block copolymers of at least two of ethylenetherephthalate, butylenetherephthalate and ethylenenaphthalate; and combinations of these. In additional aspects of this embodiment, the slurry further contains at least one of a corrosion inhibitor, an enzyme and a hydrofluoric acid source; and the carrier fluid is brine containing a monovalent salt.

An additional embodiment of the Invention is a method for temporarily reducing fluid loss to an area immediately surrounding a wellbore penetrating a subterranean formation. The method includes the steps of providing water-degradable particles formed from a solid polymeric acid precursor material, and optionally non-water-degradable particles that are generally non-degradable by the formed acid; forming a slurry of the particles with a carrier fluid; introducing the slurry of particles into the wellbore so that fluid losses are reduced for a period of time; and allowing the water-degradable particles to degrade. In various aspects of this embodiment, the slurry of the water-degradable and the non-water-degradable particles are of different size distribution so that a particle pack formed by the particles provides a permeability of less than about 25 millidarcy; the method includes providing non-water degradable particles in the slurry that are degradable in acids formed from the solid polymeric acid precursor materials as the water-degradable particles degrade; the water-degradable and acid-degradable particles of the slurry provide a particle pack that provides a permeability of less than about 25 millidarcy; the carrier fluid is a viscosified fluid; the carrier fluid is oil external/water internal emulsion; introducing the slurry of particles into the wellbore includes introducing the slurry into a perforated casing of the wellbore; introducing the slurry of particles into the wellbore includes introducing the slurry into a casing of the wellbore as a perforating fluid; introducing the slurry of particles into the wellbore includes introducing the slurry into a casing of the wellbore after the casing has been perforated; introducing the slurry of particles into the wellbore includes introducing the slurry into a casing of the wellbore after the casing has been perforated and after sand control treatment; at least some of the particles are sized to bridge against the openings of the sand control screens; the method further includes providing non-water degradable particles in the slurry that are degradable in acids formed from the solid polymeric acid precursor materials as the water-degradable particles degrade, and at least some of the particles are sized to bridge against the openings of the sand control screens; the wellbore is an uncased hole containing a sand control screen; the slurry contains from about 0.05 kg/L to about 1.2 kg/L of the water degradable particles; the water-degradable particles are the sole particles within the carrier fluid; the water-degradable particles have an average particle size of from about 2.5 mm or less. The solid polymeric acid precursor may be made from at least one of homopolymers of lactic acid, glycolic acid, hydroxybutyrate, hydroxyvalerate and epsilon caprolactone; random copolymers of at least two of lactic acid, glycolic acid, hydroxybutyrate, hydroxyvalerate, epsilon caprolactone, L-serine, L-threonine, and L-tyrosine; block copolymers of at least two of polyglycolic acid, polylactic acid, hydroxybutyrate, hydroxyvalerate, epsilon caprolactone, L-serine, L-threonine, and L-tyrosine; homopolymers of ethylenetherephthalate (PET), butylenetherephthalate (PBT) and ethylenenaphthalate (PEN); random copolymers of at least two of ethylenetherephthalate, butylenetherephthalate and ethylenenaphthalate; block copolymers of at least two of ethylenetherephthalate, butylenetherephthalate and ethylenenaphthalate; and combinations of these. In other aspects, the slurry further contains a corrosion inhibitor; the carrier fluid is brine containing a monovalent salt; the slurry is introduced into a screen assembly positioned within the wellbore, and the particles are sized to facilitate bridging of the openings of the screen of the screen assembly; andthe slurry is introduced within a wellbore having a perforated casing, and wherein the particles are sized to facilitate bridging of the perforation openings.

DETAILED DESCRIPTION

By using water-degradable particles formed from certain polymer materials that are capable of generating acids upon degradation, filtercake materials, such as those formed by conventional drilling muds, can be removed to facilitate well production and completion. Generally, the filtercake is deposited on the surfaces and adjacent areas of the wellbore and is initially beneficial due to its preventing fluid leak-off of the drilling fluids to the formation and inflow of reservoir fluids into the well during completion.

The solids in the mud are sized such that they form an efficient bridge across the pores of the formation rock as it is being drilled. As the solids in the mud develop bridges across the exposed pores (pore throats) of the reservoir, the polymeric fluid loss material (e.g. starch) from the mud is co-deposited within the interstices of the solid bridging particles, thus sealing off the reservoir from the wellbore. As described previously, the subsequent removal of the filtercake is necessary to ensure optimal productivity once the well is brought to production.

The water-degradable particles formed from the polymer materials that are capable of generating acids upon degradation are typically used in removing filtercake formed from water-based drilling muds. They may also be used in removing filtercake formed from oil-based drilling muds, however. Filtercake from oil-based drilling muds may include reversible-emulsion oil-based (water-in-oil) drilling fluids. These may be formulated so that the emulsion inverts or reverses upon the addition or generation of acids. An example of such a reversible oil mud drilling fluid is that marketed as the FAZEPRO™ System, available from M-I SWACO, Houston, Tex., U.S.A.

Additionally, during drilling of the formation, completion, workovers, etc., inadequate formation of a filtercake with conventional drilling mud, or the high permeability of the formation zones which the well penetrates, may allow large quantities of fluid to be lost to the formation. Once the fluid is lost into the formation, it may become difficult to remove. By using the water-degradable particles, a temporary "kill pill" or "fluid loss control pill" can be formed that will degrade on its own without necessitating the use of additional cleanup steps or treatments.

The filtercakes formed from drilling fluids or muds may include such things as carbonate minerals, such as calcium carbonate, and inorganic salts, such as halite (NaCl), sylvite (KCl), dolomite ($CaMg(CO_3)_2$), and magnesium oxide (MgO). Clays, (such as feldspar and smectite), barite and other inorganic materials are also sometimes included in the filter cake depending on the formulation of the drilling mud and the formation type to which the drilling mud is exposed. Polymer materials may also be included in the drilling muds and facilitate formation of the filter cake. These polymer materials may include such materials as starch, xanthan gum, hydroxyethylcellulose, scleroglucan, and polyanionic cellulose. The composition of drilling muds that may form filter cakes may vary widely. As an example, however, in water-based drilling fluids more than half of the total composition may be salt water, with the remaining mass being made up of solids or dissolved solids. The major components typically found in mud filtercake include polymers such as starch and xanthan gum, carbonates, and other inorganic salts and clays. More particularly, up to about 20% wt may be made up of polymers, about 60% wt may be carbonate particulates, and about 20% wt may be acid insolubles (such as clays).

Many of the materials of the filtercake, particularly carbonate materials and polymers, will readily degrade in acid. The materials used in forming the water-degradable particles are herein referred to as "polymeric acid precursors." These materials are typically solids at room temperature. The solid polymeric acid precursors, for example solid polymeric acid precursors, are those capable of degrading to monomeric organic acids that react with carbonate and many of the materials of the filtercake.

Gravel packing is a sand-control method used to prevent production of formation sand. In gravel packing, a steel screen is placed in the wellbore and the surrounding annulus is packed with prepared gravel of a specific size designed to prevent the passage of formation sand that could foul subterranean or surface equipment and reduce flows. The primary objective of gravel packing is to stabilize the formation while causing minimal impairment to well productivity. Sometimes gravel packing is done without a screen. In certain embodiments of the Invention, the water-degradable particles can be used with non-degradable particles or non-water-degradable particles in forming a gravel pack, thus providing a means for removing filtercake and stabilizing the well through the formation with a gravel pack in a single treatment.

The polymeric acid precursor materials include the polymers and oligomers that hydrolyze or degrade in certain chemical environments under known and controllable conditions of temperature, time and pH to release organic acid molecules that, as in the foregoing, are referred to as "monomeric organic acids." As used herein, the expression "monomeric organic acid" or "monomeric acid" may also include dimeric acid or acid with a small number of linked monomer units that function similarly, for purposes of the invention described herein, to monomer acids composed of only one monomer unit.

Polymer materials may include those polyesters obtained by polymerization of hydroxycarboxylic acids, such as the aliphatic polyester of lactic acid, referred to as polylactic acid; glycolic acid, referred to as polyglycolic acid; 3-hydroxybutyric acid, referred to as polyhydroxybutyrate; 2-hydroxyvaleric acid, referred to as polyhydroxyvalerate; epsilon caprolactone, referred to as polyepsilon caprolactone or polycarbonate; the polyesters obtained by esterification of hydroxylaminoacids such as serine, threonine and tyrosine; and the copolymers obtained by mixtures of the monomers listed above. A general structure for the above-described homopolyesters is:

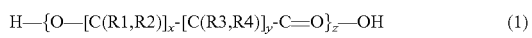

H—{O—[C(R1,R2)]$_x$-[C(R3,R4)]$_y$-C=O}$_z$—OH     (1)

where,
R1, R2, R3, R4 is either H, linear alkyl, such as CH$_3$, CH$_2$CH$_3$, (CH$_2$)$_n$CH$_3$, branched alkyl, aryl, alkylaryl, a functional alkyl group (bearing carboxylic acid groups, amino groups, hydroxyl groups, thiol groups, or others) or a functional aryl group (bearing carboxylic acid groups, amino groups, hydroxyl groups, thiol groups, or others);
x is an integer between 1 and 11;
y is an integer between 0 and 10; and
z is an integer between 2 and 50,000.

Under the appropriate conditions (for example pH, temperature, water content) polyesters like those described herein can hydrolyze and degrade to yield hydroxycarboxylic acid and compounds that pertain to those acids referred to in the foregoing as "monomeric acids."

One example of a suitable polymeric acid precursor, as mentioned above, is the polymer of lactic acid, sometimes called polylactic acid, "PLA," polylactate or polylactide. Lactic acid is a chiral molecule and has two optical isomers. These are D-lactic acid and L-lactic acid. The poly(L-lactic acid) and poly(D-lactic acid) forms are generally crystalline in nature. Polymerization of a mixture of the L- and D-lactic acids to poly(DL-lactic acid) results in a polymer that is more amorphous in nature. The polymers described herein are essentially linear. The degree of polymerization of the linear polylactic acid can vary from a few units (2-10 units) (oligomers) to several thousands (e.g. 2000-5000). Cyclic structures may also be used. The degree of polymerization of these cyclic structures may be smaller than that of the linear polymers. These cyclic structures may include cyclic dimers.

Another example is the polymer of glycolic acid (hydroxyacetic acid), also known as polyglycolic acid ("PGA"), or polyglycolide. Other materials suitable as polymeric acid precursors are all those polymers of glycolic acid with itself or other hydroxy-acid-containing moieties, as described in U.S. Pat. Nos. 4,848,467; 4,957,165; and 4,986,355, all hereby incorporated in their entirety.

The polylactic acid and polyglycolic acid may each be used as homopolymers, which may contain less than about 0.1% by weight of other comonomers. As used with reference to polylactic acid, "homopolymer(s)" is meant to include polymers of D-lactic acid, L-lactic acid and/or mixtures or copolymers of pure D-lactic acid and pure L-lactic acid. Additionally, random copolymers of lactic acid and glycolic acid and block copolymers of polylactic acid and polyglycolic acid may be used. Combinations of the described homopolymers and/or the above-described copolymers may also be used.

Other examples of polyesters of hydroxycarboxylic acids that may be used as polymeric acid precursors are the polymers of hydroxyvaleric acid (polyhydroxyvalerate), hydroxybutyric acid (polyhydroxybutyrate) and their copolymers with other hydroxycarboxylic acids. Polyesters resulting from the ring opening polymerization of lactones such as epsilon caprolactone (polyepsiloncaprolactone) or copolymers of hydroxyacids and lactones may also be used as polymeric acid precursors.

It should be understood that throughout this specification, when a concentration or amount range is described as being useful, or suitable, or the like, it is intended that any and every concentration or amount within the range, including the end points, is to be considered as having been stated. Furthermore, each numerical value should be read once as modified by the term "about" (unless already expressly so modified) and then read again as not to be so modified unless otherwise stated in context. For example, "a range of from 1 to 10" is to be read as indicating each and every possible number along the continuum between about 1 and about 10. In other words, when a certain range is expressed, even if only a few specific data points are explicitly identified or referred to within the range, or even when no data points are referred to within the range, it is to be understood that the inventors appreciate and understand that any and all data points within the range are to be considered to have been specified, and that the inventors have possession of the entire range and all points within the range.

Polyesters obtained by esterification of other hydroxyl-containing acid-containing monomers such as hydroxyaminoacids may be used as polymeric acid precursors. Naturally occurring aminoacids are L-aminoacids. Among the 20 most common aminoacids, the three that contain hydroxyl groups are L-serine, L-threonine, and L-tyrosine. These aminoacids may be polymerized to yield polyesters at the appropriate temperature, and using appropriate catalysts, by reaction of their alcohol and their carboxylic acid group. D-aminoacids are less common, but their polymers and copolymers may also be used as polymeric acid precursors.

NatureWorks, LLC, Minnetonka, Minn., USA, produces solid cyclic lactic acid dimer called "lactide" and from it produces lactic acid polymers, or polylactates, with varying molecular weights and degrees of crystallinity, under the generic trade name NATUREWORKS™ PLA. The PLA's currently available from NatureWorks, LLC have number average molecular weights (Mn) of up to about 100,000 and weight average molecular weights (Mw) of up to about 200,000, although any polylactide (made by any process by any manufacturer) may be used. Those available from Nature-Works, LLC typically have crystalline melt temperatures of from about 120 to about 170° C., but others are obtainable. Poly(D,L-lactide) at various molecular weights is also commercially available from Bio-Invigor, Beijing and Taiwan. Bio-Invigor also supplies polyglycolic acid (also known as polyglycolide) and various copolymers of lactic acid and glycolic acid, often called "polyglactin" or poly(lactide-co-glycolide).

The extent of the crystallinity can be controlled by the manufacturing method for homopolymers and by the manufacturing method and the ratio and distribution of lactide and glycolide for the copolymers. Additionally, the chirality of the lactic acid used also affects the crystallinity of the polymer. Polyglycolide can be made in a porous form. Some of the polymers dissolve very slowly in water before they hydrolyze.

An example of a suitable commercially available amorphous polymer is that available as NATUREWORKS™ 4060D PLA, available from NatureWorks, LLC, which is a poly(DL-lactic acid) and contains approximately 12% by weight of D-lactic acid and has a number average molecular weight (Mn) of approximately 98,000 g/mol and a weight average molecular weight (Mw) of approximately 186,000 g/mol.

Other polymer materials that may be useful are the polyesters obtained by polymerization of polycarboxylic acid derivatives, such as dicarboxylic acid derivatives with polyhydroxy containing compounds, in particular dihydroxy containing compounds. Polycarboxylic acid derivatives that may be used are those dicarboxylic acids such as oxalic acid, propanedioic acid, malonic acid, fumaric acid, maleic acid, succinic acid, glutaric acid, pentanedioic acid, adipic acid, phthalic acid, isophthalic acid, terephthalic acid, aspartic acid, or glutamic acid; polycarboxylic acid derivatives such as citric acid, poly and oligo acrylic acid and methacrylic acid copolymers; dicarboxylic acid anhydrides, such as, maleic anhydride, succinic anhydride, pentanedioic acid anhydride, adipic anhydride, phthalic anhydride; dicarboxylic acid halides, primarily dicarboxylic acid chlorides, such as propanedioic acyl chloride, malonyl chloride, fumaroyl chloride, maleyl chloride, succinyl chloride, glutaroyl chloride, adipoyl chloride, and phthaloyl chloride. Useful polyhydroxy containing compounds are those dihydroxy compounds such as ethylene glycol, propylene glycol, 1,4 butanediol, 1,5 pentanediol, 1,6 hexanediol, hydroquinone, resorcinol, bisphenols such as bisphenol acetone (bisphenol A) or bisphenol formaldehyde (bisphenol F); and polyols such as glycerol. When both a dicarboxylic acid derivative and a dihydroxy compound are used, a linear polyester results. It is understood that when one type of dicarboxylic acid is used, and one type of dihydroxy compound is used, a linear homopolyester is obtained. When multiple types of polycarboxylic acids and/or polyhydroxy containing monomers are used, copolyesters are obtained. According to the Flory Stockmayer kinetics, the "functionality" of the polycarboxylic acid monomers (number of acid groups per monomer molecule) and the "functionality" of the polyhydroxy containing monomers (number of hydroxyl groups per monomer molecule) and their respective concentrations, will determine the configuration of the polymer (linear, branched, star, slightly crosslinked or fully crosslinked). All these configurations can be hydrolyzed or "degraded" to carboxylic acid monomers, and therefore can be considered as polymeric acid precursors. As a particular example, not intended to be comprehensive of all the possible polyester structures one can consider, but just to provide an indication of the general structure of the most simple case one can encounter, the general structure for the linear homopolyesters of the invention is:

$$H—\{O\text{-}R1\text{-}O—C=O\text{-}R2\text{-}C=O\}_z—OH \quad (2)$$

where,

R1 and R2, are linear alkyl, branched alkyl, aryl, alkylaryl groups; and z is an integer between 2 and 50,000.

Other examples of suitable polymeric acid precursors are the polyesters derived from phthalic acid derivatives such as polyethylenetherephthalate (PET), polybutylenetherephthalate (PBT), polyethylenenaphthalate (PEN), and the like.

Under the appropriate conditions (for example pH, Temperature, water content) polyesters like those described herein can "hydrolyze" and "degrade" to yield polycarboxylic acids and polyhydroxy compounds, regardless of the original polyester being synthesized, from any one or more of the polycarboxylic acid derivatives listed above. The polycarboxylic acid compounds that will be yielded by the polymer degradation process are also considered monomeric acids.

Other examples of polymer materials that may be used are those obtained by the polymerization of sulfonic acid derivatives with polyhydroxy compounds, such as polysulphones or phosphoric acid derivatives with polyhydroxy compounds, such as polyphosphates.

Degradation times may vary and the water-degradable particles may be selected to provide a desired degradation rate, which may be dependent upon the formation temperature and other conditions, such as pH. Typical degradation times for many applications may range from less than an hour to 12 hours or more. In particular, at 200° F. (93.3° C.), which is a typical formation temperature, the particles may substantially degrade in about 4 to 6 hours to as much as 12 hours or more in an aqueous fluid. At 300° F. (148.9° C.) the same particles may substantially degrade in about one hour or less.

In certain situations, solid polymeric acid precursor materials may be treated to slow the hydrolysis. This treatment may include coating the particles. Suitable coatings include polycaprolate (a copolymer of glycolide and epsilon-caprolactone), and calcium stearate, both of which are hydrophobic. Polycaprolate itself slowly hydrolyzes. Generating a hydrophobic layer on the surface of the solid acid precursors, or the mixtures of solid polymeric acid precursors, by any means delays the hydrolysis. Note that coating described herein may refer to encapsulation or simply to changing the surface by chemical reaction or by forming or adding a thin film of another material. Another suitable method of delaying the hydrolysis of the solid acid precursor, and the release of acid, is to suspend the solid acid precursor, optionally with a hydrophobic coating, in an oil or in the oil phase of an emulsion. The hydrolysis and acid release do not occur until water contacts the solid acid precursor. Methods used to delay hydrolysis may be used in conjunction with inclusion of solid acid-reactive material) see below) to degrade the polymeric acid precursor because it may be desirable to delay degradation but then to degrade the polymer rapidly.

It has been found that dissolution of the polymeric acid precursors (for example the solid polymeric acid precursors) may also be accelerated by the addition of certain chemical agents. These agents react readily with the solid polymeric acid precursor and may cause the removal of a small amount of material from the solid acid precursor surface. Not to be limited by theory, but it is believed that an intact surface of the solid acid precursor is comparatively insoluble, but that when the surface is disrupted by the removal of a small amount of material subsequent dissolution of additional material from that surface is easier. Only a small amount of the accelerating agent ("accelerant") is necessary to start the dissolution process; thereafter it will proceed without any added agent. On the other hand, if there is additional agent present, since it reacts readily with the solid polymeric acid precursor it will accelerate the continuing dissolution process. This is the "accelerant" mechanism. Note that the accelerant may not consume all of the acid generated, but may cause more rapid degradation of the polymer by disrupting the solid polymeric acid precursor surface structure. If the agent is a solid, it cannot accelerate the initial dissolution because there is inadequate chemical interaction between the two solids, but once the dissolution of the solid polymeric acid precursor starts (for example as a result of an increase in temperature in an aqueous environment) the solid acid-reactive material will accelerate subsequent dissolution. Note that the formation itself can be a solid accelerant. Furthermore, the action of accelerants may be delayed, for example, if they are slowly soluble solids or if they are chemically bound in a liquid chemical that must be hydrolyzed to release the agent. One solid acid precursor may be an accelerant for another; for example, PGA accelerates the hydrolysis of PLA. The timing and rate of dissolution of the solid acid precursor is controlled by these techniques.

To accelerate the dissolution of solid polymeric acid precursors, water-insoluble (or partially or slowly water-insoluble) solid acid-soluble or acid-reactive materials, such as but not limited to magnesium hydroxide, magnesium carbonate, magnesium oxide, dolomite (magnesium calcium carbonate), calcium carbonate, aluminum hydroxide, calcium oxalate, calcium phosphate, aluminum metaphosphate, sodium zinc potassium polyphosphate glass, and sodium calcium magnesium polyphosphate glass, may be mixed with or incorporated into, solid polymeric acid precursors, such as cyclic ester dimers of lactic acid or glycolic acid or homopolymers or copolymers of lactic acid or glycolic acid. These mixtures may be added to a fracturing fluid, gravel packing fluid, or other treating fluid. At least a portion of the solid polymeric acid precursor slowly hydrolyzes at controllable rates to degrade at pre-selected locations and times in the formation or wellbore. The dissolved solid polymeric acid precursors will form acids that may react with the filtercake materials and formation faces, which may beneficial. The acids may also react with and dissolve at least a portion of the acid-reactive materials, if they are present. This will accelerate the dissolution of the solid polymeric acid precursor and generate acid in amounts beyond that which reacts with the solid acid-reactive material. The result is that at least a portion of both the solid acid precursor and the acid-reactive solid material dissolves. Usually most or all of the solid material initially added is no longer present at the end of the treatment. Note that often the additional solid acid-reactive material will not be needed to accelerate the hydrolysis of the solid acid precursor, because the filtercake materials (or the formation itself if it is available for reaction) will be acid-reactive. However, the solid acid-reactive material may be selected to be more reactive than the filtercake materials or formation, or may be in more intimate contact with the solid polymeric acid precursor.

Mixtures of one or more solid polymeric acid precursors and one or more solid acid-reactive materials, if they are present, may be purely physical mixtures of separate particles of the separate components. The mixtures may also be manufactured such that one or more solid polymeric acid precursors and one or more solid acid-reactive materials are in each particle; this will be termed a "combined mixture". This may be done, for example, by coating the acid-reactive material with the solid polymeric acid precursor, or by heating a physical mixture until the solid polymeric acid precursor melts, mixing thoroughly, cooling, and comminuting. Such mixtures of polymers and solids are commonly referred to as "filled polymers". In any case, the distribution of the components in the mixtures may be as uniform as possible. The choices and relative amounts of the components may be adjusted for the situation to control the solid polymeric acid precursor hydrolysis rate. This may depend upon the temperature at which the treatment will be carried out, the composition of the aqueous fluid or fluids with which the mixture will come into contact, and the time and rate desired for degradation of the polymer. The combined mixture or filled polymers that contain both the solid polymeric acid precursor and the acid-soluble particulate material may be formed, for example, by co-extruding mixtures of the materials. Calcium carbonate (or other solid acid-reactive materials) coated with solid acid precursor may also be used.

The dissolution of solid polymeric acid precursors may also be accelerated by the addition of certain soluble liquid additives. These may be included or present in subsequently introduced treating fluids or may be added specifically for accelerating the polymer degradation. These accelerants may be acids, bases, or sources of acids or bases. These are particularly useful at low temperatures (for example below about 135° C.), at which the solid acid precursors hydrolyze slowly, relative to the time an operator would like to put a well on production after a gravel packing treatment, fracturing treatment, or the like. Non-limiting examples of such soluble liquid additives that hydrolyze to release organic acids are esters (including cyclic esters), diesters, anhydrides, lactones and amides. A compound of this type, and the proper amount, that hydrolyzes at the appropriate rate for the temperature of the formation and the pH of the treating fluid, is readily identified for a given treatment by simple laboratory hydrolysis experiments. Other suitable soluble liquid additives are simple bases. (They are termed "liquids" because in practice it would be simpler and safer to add them to the fluids as aqueous solutions rather than as solids.) Suitable bases are sodium hydroxide, potassium hydroxide, and ammonium hydroxide. Other suitable soluble liquid additives are alkoxides, water-soluble carbonates and bicarbonates, alcohols such as but not limited to methanol and ethanol, alkanol amines and organic amines such monoethanol amine and methyl amine. Other suitable soluble liquid additives are acids, such as but not limited to hydrochloric acid, hydrofluoric acid, ammonium bifluoride, formic acid, acetic acid, lactic acid, glycolic acid, aminopolycarboxylic acids (such as but not limited to hydroxyethyliminodiacetic acid), polyaminopolycarboxylic acids (such as but not limited to hydroxyethylethylenediaminetriacetic acid), salts—including partial salts—of the organic acids (for example, ammonium, potassium or sodium salts), and mixtures of these acids or salts. (Ammonium bifluoride partially hydrolyzes in contact with water to form some HF, and so will be called an acid here.) The organic acids may be used as their salts.

If stored for long periods of time at the surface prior to use, under certain environmental conditions, the solid polymeric acid precursor particles may tend to stick together. An anti-caking agent, such as magnesium stearate may therefore be combined with the particles. Typically, the anti-caking agent is used in an amount of from about 0.2% or less by weight of the water-degradable particles.

For the applications described herein, although in many cases the water-degradable particles will have a generally spherical configuration, the water-degradable particles may also have other solid shapes as well, such as but not limited to fibers, beads, films, ribbons and platelets.

When used as a fluid loss control pill or kill pill, the water-degradable particles, filled or non-filled, may be used alone, without any other non-water degradable particles. This is to ensure the temporary nature of the material as a fluid loss agent. In such applications, the water-degradable particles will typically have a particle size of from about 2.5 mm or less. At least some of the particles are selected from sizes to facilitate bridging of the openings of the screen of the screen assembly into which they are introduced, or, for a wellbore having a perforated casing, at least some of the particles are sized to facilitate bridging of the perforation openings. Larger and smaller water-degradable particles may used in combination. U.S. Patent Application Publication No. 2006/0157248, which is herein incorporated by reference, provides selection of particle sizes as it relates to pore opening size and bridging of particles for fluid loss control. The permeability of the particle pack formed from the particles may have a permeability of about 25 millidarcy or less.

In certain embodiments, when used as a fluid loss control pill, the water-degradable particles may be used in combination with non-water degradable particles that are acid degradable or acid reactive, such as calcium carbonate ($CaCO_3$) particles. In such instances, the water-degradable particles may be mixed with smaller size acid-degradable particles. For example, 20/40 mesh water-degradable particles will form a pack with a pore size of approximately 100 to 110 microns. By adding $CaCO_3$ particles of sizes on the order of 40 microns and smaller, the permeability of the pack can be further reduced significantly and in a cost effective way, as well as provide better control of degradation time of the water-degradable particles. The size of the water-degradable particles is designed for a particular degradation time and the carbonate particles function only to reduce the permeability of the pack and thus reduce the fluid losses into the formation. The permeability of the particle pack formed from the combination of particles may provide a permeability of about 25 millidarcy or less. Once water-degradable particles degrade and acid is formed, the acid dissolves the $CaCO_3$ particles, and results in destruction of the formed filtercake.

In removing filtercakes formed from drilling mud, the water-degradable particles may be used alone, without any non-degradable particles. The water-degradable particles do not include any non-degradable core or other materials, such that under appropriate conditions, all of the particle will eventually degrade or dissolve. When used alone, the water-degradable particles may have a particle size of from about 2.5 mm or less, (e.g. from about 0.2 mm to about 2.5 mm) with particle sizes of from about 0.4 mm to about 0.85 mm being more typical. A mixture of different sizes of water-degradable particles may also be used. Larger size particles may tend to degrade more slowly, therefore smaller size particles may be used to accelerate degradation.

For filtercake removal, the water-degradable particles, filled or non-filled, may also be used in combination with other non-degradable particles. The non-degradable particles may be used in forming a gravel pack that remains within the wellbore after the water-degradable particles have degraded. Suitable materials for the gravel pack include, for example, sand, resin particles, walnut shells, and resin coated particles. The non-degradable particles may have a particles size of from 0.2 mm to about 2.5 mm. Selection of the non-degradable particle size may be based upon the size and configuration of screen openings or perforations.

When used in combination with non-degradable particles, particularly in forming gravel packs, the water-degradable particles (comprising polymeric acid precursors) may be smaller in size. The size of the water-degradable particles may be selected based upon the size of the non-degradable particles used in forming the gravel pack. Typically, the water-degradable particles will be significantly smaller than the non-degradable particles. The water-degradable particles may have a particle size that is less than 0.2 times the average particle size of the non-degradable particles. More particularly, the water-degradable particles may have a maximum particle size that is less than $\frac{1}{6}$ (or ~0.167 times) the particle size of the non-degradable particles, which correlates to the approximate pore size of the non-degradable particle pack. For example, when using gravel particles having an average particle size of 20 to 40 mesh (0.841 mm to 0.420 mm), water-degradable particles having an average particle size of from about 105 microns [(0.841 mm+0.420 mm)/2*0.167=0.105 mm] or less may be used.

When used with other non-degradable particles, the water-degradable particles may be used in an amount of from greater than 0% to about 20% by weight of total particles, for example from about 5% to about 15% by weight of total particles. The amount of water-degradable particles used may vary depending upon the particular application and how much is necessary to facilitate filter cake removal.

The solid polymeric acid precursor particles, with or without any non-degradable particles, are combined with a carrier fluid to form a slurry. The carrier fluid may be any fluid having properties that allow the water-degradable materials to be transported therein. The carrier fluid may be an aqueous fluid that is capable under downhole conditions of degrading the water-degradable particles itself and may include accelerants. In particular, an aqueous fluid is used as the carrier fluid so that it serves to degrade the water-degradable material alone or in combination with other fluids found or introduced into the formation. Examples of suitable aqueous carrier fluids may include water, brine, viscosified fluids, such as water based guar, modified guar gel crosslinked with borate or organometallic compounds, water viscosified with polymers of HEC, starch, xanthan, scleroglucan, or water viscosified with a viscoelastic surfactant (for example one that forms micelles), viscosified oil, emulsions, cross-linked, energized fluids (with nitrogen or $CO_2$ gas) and slickwater (water containing a small amount of polymer or viscoelastic surfactant that serves primarily as a friction reducer rather than primarily as a viscosifier). The properties of the carrier fluid may be modified through the use of gelling agents, pH adjustors or the addition of breakers to provide the desired characteristics.

The carrier fluid may initially be at a low temperature where the degradation of the solid polymeric acid precursor occurs slowly. Upon placement of the slurry of the carrier fluid and solid polymeric acid precursor particles within the formation, the elevated temperature of the formation may facilitate the accelerated hydrolysis of the polymeric acid precursor.

The aqueous carrier fluid may be an aqueous brine containing a monovalent salt. Monovalent salts may facilitate prevention of salts precipitating out from the acids formed from the degradation of the solid polymeric acid precursors. Examples of suitable salts include KCl, NaCl, NaBr, potassium formate (K(HCOO)), sodium formate, etc., and combinations thereof.

Corrosion inhibitors may also be combined with the solid polymeric acid precursors in forming the slurry. These may be used to prevent corrosion of the completion equipment downhole, once the material has degraded. Suitable corrosion inhibitors may include quaternary amines, inorganic bases (e.g. pyridine) and proton scavengers (e.g. mercaptoethanol). The corrosion inhibitors are usually used in an amount of from less than about 0.5% or about 1% by volume of the slurry, for example, from about 0.05% to about 0.2% by volume of slurry.

Enzymes may also be combined with the water-degradable particles. The enzymes facilitate the degrading or decomposition of polymers and starches of the drilling mud filtercake. The enzymes may react generally prior to the substantial degradation of the solid polymeric acid precursors to their acids. Additionally, the enzymes may facilitate degrading of polymer viscosified carrier fluids used with the particles.

A source of hydrofluoric acid (HF) may also be included in the slurry of solid polymeric acid precursors particles when used for filtercake removal to facilitate degrading of certain inorganics (e.g. quartz, feldspar, clays, etc.) of the filtercake. As used herein, the expression "source of hydrofluoric acid" is meant to include both hydrofluoric acid itself or a compound that is capable of generating hydrofluoric acid, such as ammonium bifluoride, ammonium fluoride, fluoboric acid, hexafluorophosphoric acid, difluorophosphoric acid, fluorosulfonic acid, or a solid hydrogen fluoride source such as polyvinylammonium fluoride. The hydrofluoric acid source may be used in combination with a delaying agent such as boron, boric acid, a chelant/ligand (e.g. diammonium HEDTA), etc., that temporarily prevents the hydrofluoric acid from interacting with the inorganics until such time as the delay agent releases the hydrofluoric acid to react with the inorganic components in the filtercake. The hydrofluoric acid source may be used in an amount of from about 0.2% to about 6% by weight of the slurry. When using hydrofluoric acid sources, the carrier fluid may be a brine that includes ammonium bromide or ammonium chloride salts to serve as counter ions to the hydrofluoric acid ions. Brines containing potassium or sodium ions may lead to unwanted precipitation of fluoride salts. Corrosion inhibitors, such as quaternary amines, may also be used with the hydrofluoric acid source.

For a given treatment, the appropriate solid polymeric acid precursor is selected from among many available materials. The rate of degradation from a particular solid polymeric acid precursor or a particular mixture of a solid acid precursor and a solid acid-reactive material, having a particular chemical and physical make-up, including a coating if present, at a particular temperature and in contact with a fluid or fluids of a particular composition (for example pH and the concentration and nature of other components, especially electrolytes) may be determined experimentally by exposing the acid precursor to the fluid or fluids under treatment conditions and monitoring the polymer degradation.

The rate of solid acid-reactive material dissolution, if the solid acid-reactive material is included, is governed by similar factors (such as by the choice of solid acid-reactive material, the ratio of materials, the particle size, calcining and coating of solid acid-reactive material) and may readily and easily be determined by similar experiments. Naturally, a solid polymeric acid precursor is selected that a) degrades at the desired rate (after a suitable delay if needed) and b) is compatible with and does not interfere significantly with the function of other components of the treating fluids. An acid-reactive material may be selected that accelerates degradation to a suitable extent and is compatible with the function of other treatment fluids.

In use as a fluid loss control or kill pill, the total particles (i.e. the water-degradable particles, alone or in combination with non-water degradable/acid-degradable particles, such as $CaCO_3$), will typically be used in an amount of from about 0.05 kg/L to about 1.2 kg/L of the slurry. Typically, limited amounts of slurry will be used. The slurry may be introduced into a screen of a screen assembly so that the water-degradable particles bridge and temporarily close off openings of the screen of the screen assembly. The sand control screen may be used in an uncased (open) hole. The kill pill treating slurry may also be introduced into a wellbore containing a casing to bridge and close off perforations formed in the casing of the wellbore. The slurry may be introduced prior to or subsequent to perforation of the casing, and after sand control treatment. The slurry may also be used as a perforating fluid that is used during perforation of the casing.

For use in removing filtercake in areas in and immediately surrounding the wellbore, the water-degradable particles may be used alone or in combination with non-degradable particles, which are used in forming a gravel pack. In either case, the slurry of particles may be introduced into the screen annulus of a screen assembly positioned within the wellbore so that they collect along the portion of the wellbore for which filtercake removal is desired and/or for which the gravel pack is desired. When we refer to filtercake in or on a portion of a subterranean formation penetrated by a wellbore, or in an area surrounding a wellbore, we include the wellbore face (if the well is uncased) or the perforation tunnels, as well as filtercake in or on screens in the wellbore.

Because the water-degradable particles degrade, there is no need for the use of internal or external breakers or the use of subsequent treatment stages to remove or degrade the water-degradable particles once they are in place. Because the polymeric acid precursor materials form acid gradually, there is less likelihood of the acid materials reacting with only certain portions of the filtercake or forming wormholes that cause fluid leakoff.

The solid polymeric acid precursor materials eventually dissolve or degrade, providing temporary fluid diversion or temporarily plugging fluid loss zones, when used as a kill pill. The aqueous fluids of the carrier fluid eventually cause the water-degradable materials to degrade or hydrolyze to their monomeric acids, so that they are readily removed with fluid flowback and normal production of hydrocarbons. There is no permanent damage to the formation. In fact, the acids produced may be beneficial in increasing permeability of the producing formation after their use as a fluid loss agent.

The following examples serve to illustrate the invention further:

EXAMPLES

Example 1

A breakthrough test on a water-based mud filtercake with no clays present was carried out at a temperature of approximately 225° F. (107° C.) at approximately 100 psi (670 kPa). The filtercake had a 3 mm external thickness and a 1 mm internal thickness. Testing was carried out on a static fluid loss high temperature high pressure (HTHP) cell obtained from Fann and was modified to accommodate a 1 in (25.4 mm) Berea sandstone core sample. The core was saturated in a 2 wt. % KCl brine and the permeability of the core was determined. First, a water-based mud filtercake was deposited onto the core sample at 225° F. (107° C.). Once the excess mud had been rinsed off, 10 wt % polylactic acid slurry with an average particle size of 0.63 mm was prepared in heavy brine water (e.g. NaCl at 24.5 wt. %) and a small amount of corrosion inhibitor was added (e.g. 0.1 vol. %) and placed into the HTHP cell. The cell was pressurized to 100 psi (670 kPa) and the mass of the fluid loss was recorded over time.

For comparison, in a second HTHP cell a solution of 50 vol. % chelant (e.g. dipotassium EDTA) and 3 vol. % alpha-amylase enzyme with no polylactic acid was prepared in heavy brine water (e.g. NaCl at 24.5 wt. %) and added to a core with a water-based mud filtercake deposited on it. The cell was pressurized to 100 psi (670 kPa) and the mass of the fluid loss was recorded. After each cell had been completely evacuated of cleanup fluids, the resulting final permeability of each core was determined.

The mass of fluid detected indicates when the filtercake has been removed by the cleanup solution in the cell. The results presented in FIG. 1 indicate that there was a significant time delay advantage in using the polylactic acid slurry compared to the chelant/enzyme treatment fluid. The final permeabilities of each core sample from each cleanup solution were comparable (5% difference), indicating that the use of a polylactic acid slurry gave the advantage of more time delay with a cleanup ability comparable to that of chelant/enzyme treatments.

Example 2

To test the ability of the polylactic acid slurry to form a self-destructing kill pill, a slurry of polylactic acid particles was generated and placed against the interior of a screen and tested at 225° F. (107° C.) at 400 psi (2758 kPa). The HTHP cell obtained from Fann consisted of a ceramic disk (2.25 in [57.2 mm] diameter, 0.25 in [6.4 mm] thick) with a pore size of 5 micrometers; it was saturated in 2 wt % KCl brine. The disk was placed inside a HTHP cell, then 100 grams of 20/40 Ottawa sand, and then a 10 gauge SS316 wire-wrapped screen coupon was placed on top of the gravel pack, with the interior of the screen facing upwards. A slurry of polylactic acid particles with an average particle size of 0.63 mm and calcium carbonate particles with an average particle size of 0.04 mm and 0.02 mm was added to heavy brine (e.g. 21.5 wt. % KCl) with a total solids concentration of about 0.114 kg/L. This slurry was then added to the HTHP cell. The cell was pressurized to 100 psi (670 kPa) and the mass of the fluid loss was recorded. The results are shown in FIG. 2.

Figure 2:
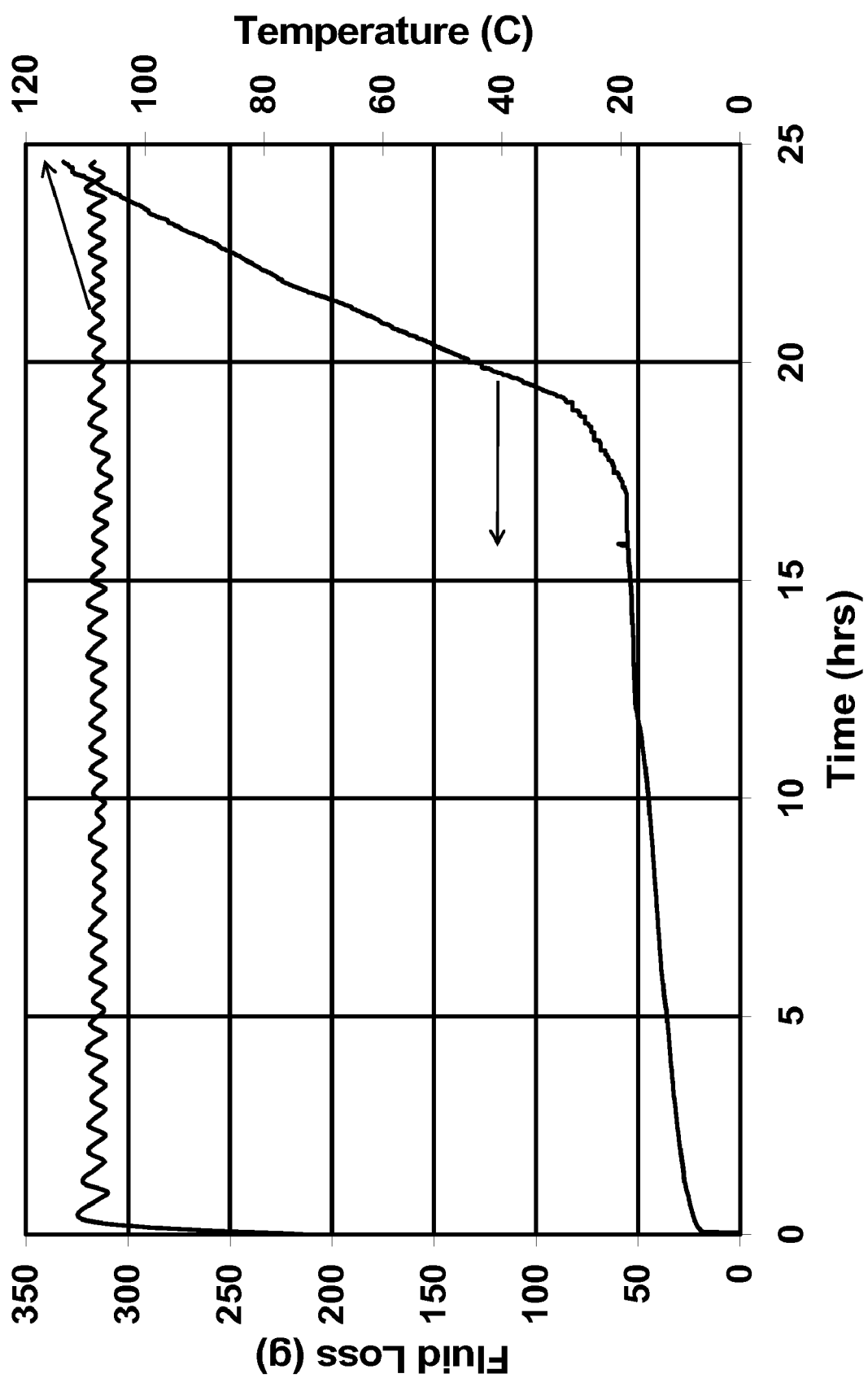
FIG. 2 is a plot of fluid loss over time for a fluid loss control pill formed from polylactic acid particles used against a sand control screen.

The results presented in FIG. 2 indicate that there was sufficient reduction in fluid loss to prevent dehydration of the polylactic slurry placed inside the screen for 17 hrs. However, from 17 hr until 24 hr, all of the fluid evacuated the cell and the kill pill was spent. This experiment demonstrated the ability of the polylactic acid slurry to form a plug against a screen typically used in sand control applications that self-destructed after a pre-determined amount of time. No breakers were added in the test.

While the invention has been shown in only some of its forms, it should be apparent to those skilled in the art that it is not so limited, but is susceptible to various changes and modifications without departing from the scope of the invention. Accordingly, it is appropriate that the appended claims be construed broadly and in a manner consistent with the scope of the invention.

We claim:

1. A method for removing preexisting filtercake from a portion of subterranean formation penetrated by a wellbore, the method comprising:
providing water-degradable particles formed from a solid polymeric acid precursor material that is capable of degrading to acid for reacting with materials of the filtercake;
forming a slurry of the particles with a carrier fluid wherein the carrier fluid comprises water; brine; water based guar; modified guar gel crosslinked with borate and/or organometallic compounds; water viscosified with polymers of HEC, starch, xanthan, and/or scleroglucan; emulsions; cross-linked, energized fluids; and/or water comprising a friction reducer;
introducing the slurry of particles into the wellbore; and
allowing the water-degradable particles to degrade to form acid, whereby the formed acid facilitates decomposition of preexisting filtercake materials,
wherein the filtercake materials have a permeability of less than about 25 millidarcy.

2. The method of claim 1, wherein: the slurry further contains non-water-degradable particles formed from materials that are non-degradable by the formed acid, the non-water-degradable particles having an average particle size that is at least six times greater than the average particle size of the water degradable particles.

3. The method of claim 2, wherein: the slurry contains from about 0.05 kg/L to about 1.2 kg/L of non-water-degradable particles, and both the water degradable and the non-water degradable particles have an average particle size of from about 0.2 mm to about 2.5 mm.

4. The method of claim 1, wherein: the slurry contains from about 0.05 kg/L to about 0.6 kg/L of the water degradable particles.

5. The method of claim 1, wherein: the solid polymeric acid precursor comprises at least one of homopolymers of lactic acid, glycolic acid, hydroxybutyrate, hydroxyvalerate and epsilon caprolactone; random copolymers of at least two of lactic acid, glycolic acid, hydroxybutyrate, hydroxyvalerate, epsilon caprolactone, L-serine, L-threonine, and L-tyrosine; block copolymers of at least two of polyglycolic acid, polylactic acid, hydroxybutyrate, hydroxyvalerate, epsilon caprolactone, L-serine, L-threonine, and L-tyrosine; homopolymers of ethylenetherephthalate (PET), butylenetherephthalate (PBT) and ethylenenaphthalate (PEN); random copolymers of at least two of ethylenetherephthalate, butylenetherephthalate and ethylenenaphthalate; block copolymers of at least two of ethylenetherephthalate, butylenetherephthalate and ethylenenaphthalate; and combinations of these.

6. The method of claim 1, wherein: the slurry further contains at least one of a corrosion inhibitor, an enzyme and a hydrofluoric acid source.

7. The method of claim 1, wherein: the carrier fluid is brine containing a monovalent salt.

8. The method of claim 2, wherein: the water-degradable particles comprise from about 0.1% to about 15% by total weight of the water-degradable and the non-water-degradable particles.

9. The method of claim 1, wherein:
the filtercake is an oil-based mud filtercake or a reversible oil-based mud filtercake.

10. The method of claim 1 further comprising: positioning a sand control screen within the wellbore prior to introducing the slurry of particles into the wellbore.

11. A method for temporarily reducing fluid loss to an area immediately surrounding a wellbore penetrating a subterranean formation, the method comprising:
providing water-degradable particles formed from a solid polymeric acid precursor material, and optionally non-water-degradable particles that are non-degradable by the formed acid;
forming a slurry of the particles with a carrier fluid wherein the carrier fluid comprises water; brine; water based guar; modified guar gel crosslinked with borate and/or organometallic compounds; water viscosified with polymers of HEC, starch, xanthan, and/or scleroglucan; emulsions; cross-linked, energized fluids; and/or water comprising a friction reducer;

introducing the slurry of particles into the wellbore so that fluid losses are reduced for a period of time; and allowing the water-degradable particles to degrade, wherein the water-degradable particles provides a particle pack that provides a permeability of less than about 25 millidarcy.

12. The method of claim 11, wherein: the slurry of the water-degradable and the non-water-degradable particles are of different size distribution so that a particle pack formed by the particles provides a permeability of less than about 25 millidarcy.

13. The method of claim 11, wherein:
the carrier fluid is a viscosified fluid or an oil external/water internal emulsion.

14. The method of claim 11, wherein: introducing the slurry of particles into the wellbore includes introducing the slurry into a perforated casing of the wellbore.

15. The method of claim 11, wherein: introducing the slurry of particles into the wellbore includes introducing the slurry into a casing of the wellbore as a perforating fluid.

16. The method of claim 11, wherein:
introducing the slurry of particles into the wellbore includes introducing the slurry into a casing of the wellbore after the casing has been perforated and after sand control treatment, wherein: at least some of the particles are sized to bridge against the openings of the sand control screens.

17. The method of claim 16, further comprising:
providing non-water degradable particles in the slurry that are degradable in acids formed from the solid polymeric acid precursor materials as the water-degradable particles degrade; and wherein at least some of the particles are sized to bridge against the openings of the sand control screens.

18. The method of claim 11, wherein: the wellbore is an uncased hole containing a sand control screen.

19. The method of claim 11, wherein: the slurry contains from about 0.05 kg/L to about 1.2 kg/L of the water degradable particles, and the water-degradable particles have an average particle size of from about 2.5 mm or less.

20. The method of claim 11, wherein: the solid polymeric acid precursor comprises at least one of homopolymers of lactic acid, glycolic acid, hydroxybutyrate, hydroxyvalerate and epsilon caprolactone; random copolymers of at least two of lactic acid, glycolic acid, hydroxybutyrate, hydroxyvalerate, epsilon caprolactone, L-serine, L-threonine, and L-tyrosine; block copolymers of at least two of polyglycolic acid, polylactic acid, hydroxybutyrate, hydroxyvalerate, epsilon caprolactone, L-serine, L-threonine, and L-tyrosine;

homopolymers of ethylenetherephthalate (PET), butylenetherephthalate (PBT) and ethylenenaphthalate (PEN); random copolymers of at least two of ethylenetherephthalate, butylenetherephthalate and ethylenenaphthalate; block copolymers of at least two of ethylenetherephthalate, butylenetherephthalate and ethylenenaphthalate; and combinations of these.

21. The method of claim 11, wherein: the slurry further contains a corrosion inhibitor.

22. The method of claim 11, wherein: the carrier fluid is brine containing a monovalent salt.

23. The method of claim 11, wherein: the slurry is introduced into a screen assembly positioned within the wellbore, and wherein the particles are sized to facilitate bridging of the openings of the screen of the screen assembly.

* * * * *